US008456433B2

(12) United States Patent
Chen

(10) Patent No.: US 8,456,433 B2
(45) Date of Patent: Jun. 4, 2013

(54) SIGNAL PROCESSING APPARATUS, SIGNAL PROCESSING METHOD AND SELECTION METHOD OF USER INTERFACE ICON FOR MULTI-TOUCH PANEL

(75) Inventor: Yu Jen Chen, Hsinchu Hsien (TW)

(73) Assignee: Mstar Semiconductor Inc., Hsinchu Hsien (TW)

( * ) Notice: Subject to any disclaimer, the term of this patent is extended or adjusted under 35 U.S.C. 154(b) by 674 days.

(21) Appl. No.: 12/632,931

(22) Filed: Dec. 8, 2009

(65) Prior Publication Data

US 2010/0194702 A1 Aug. 5, 2010

(30) Foreign Application Priority Data

Feb. 4, 2009 (TW) ................ 98103482 A

(51) Int. Cl.
*G06F 3/041* (2006.01)
(52) U.S. Cl.
USPC .......................................... 345/173; 345/174
(58) Field of Classification Search
None
See application file for complete search history.

(56) References Cited

U.S. PATENT DOCUMENTS

| | | | | |
|---|---|---|---|---|
| 7,924,271 B2 * | 4/2011 | Christie et al. | ................ | 345/173 |
| 8,106,892 B2 * | 1/2012 | Felder et al. | ................ | 345/174 |
| 8,294,686 B2 * | 10/2012 | Townsend et al. | ........... | 345/173 |
| 2004/0150668 A1 * | 8/2004 | Myers et al. | ................. | 345/771 |
| 2006/0026535 A1 * | 2/2006 | Hotelling et al. | ............. | 715/863 |
| 2006/0197753 A1 * | 9/2006 | Hotelling | ....................... | 345/173 |
| 2008/0168403 A1 * | 7/2008 | Westerman et al. | .......... | 715/863 |
| 2008/0211783 A1 * | 9/2008 | Hotelling et al. | ............. | 345/173 |
| 2009/0135147 A1 * | 5/2009 | Hsu et al. | ...................... | 345/173 |
| 2010/0053111 A1 * | 3/2010 | Karlsson | ....................... | 345/174 |
| 2010/0073303 A1 * | 3/2010 | Wu et al. | ........................ | 345/173 |
| 2010/0079386 A1 * | 4/2010 | Scott et al. | ...................... | 345/173 |
| 2010/0107067 A1 * | 4/2010 | Vaisanen | ....................... | 715/702 |
| 2010/0156795 A1 * | 6/2010 | Kim et al. | ...................... | 345/168 |
| 2010/0171711 A1 * | 7/2010 | Mak-Fan et al. | ............... | 345/173 |
| 2011/0069018 A1 * | 3/2011 | Atkins et al. | ................... | 345/173 |

FOREIGN PATENT DOCUMENTS

CN 101097496 1/2008

OTHER PUBLICATIONS

State Intellectual Property Office of the People's Republic of China, "Office Action", Apr. 26, 2011, China.

* cited by examiner

*Primary Examiner* — Dismery Mercedes
(74) *Attorney, Agent, or Firm* — WPAT, PC; Justin King

(57) ABSTRACT

The present invention provides a signal processing apparatus and a signal processing method of a man-machine interface. The signal processing method comprises steps of: receiving a first touch signal; recognizing an object corresponding to the first touch signal; determining whether a second touch signal is received while receiving the first touch signal; and selecting the object corresponding to the first touch signal when receiving the second touch signal.

17 Claims, 7 Drawing Sheets

SIGNAL PROCESSING APPARATUS, SIGNAL PROCESSING METHOD AND SELECTION METHOD OF USER INTERFACE ICON FOR MULTI-TOUCH PANEL

CROSS REFERENCE TO RELATED PATENT APPLICATION

This patent application is based on Taiwan, R.O.C. patent application No. 98103482 filed on Feb. 4, 2009.

FIELD OF THE INVENTION

The present invention relates to a man-machine interface (MMI) technology, and more specifically relates to an MMI technology applied to a multi-touch panel.

BACKGROUND OF THE INVENTION

A man-machine interface (MMI) is a communication tool between a user and an electrical system such as a computer or an embedded system. Through the MMI, a user can input instructions to control the electrical system, and the result is displayed after the instructions are executed by the electrical system. A mouse is one of the common input interfaces. A user can move a cursor accordingly on a screen by moving the mouse. However, the volume of the mouse is too large to be integrated into the embedded system directly. Therefore, a touch panel is developed to be a new generation of the MMI.

Both prior single-touch panels and recently developed multi-touch panels are designed to realize inputting instructions through pointing at an object. For example, there are many function options, such as a menu and a number keypad, displayed on the screen of a mobile phone, and a user can input a phone number by pointing at the corresponding number keypad in sequence on the touch panel of the mobile phone. However, the sensitivity of each touch panel to receiving a touch action varies. When the sensitivity is low, the user needs to press hard on the touch panel, and that shall put a burden on fingers after extensive utilization. On the contrary, when the sensitivity is too high, one is prone to accidentally point at a needless function option such that the touch panel becomes difficult to manipulate. Therefore, it is necessary to develop a design, which is different from the prior pointing operation, for raising the control accuracy for users.

SUMMARY OF THE INVENTION

It is an objective of the present invention to provide a signal processing apparatus and a signal processing method of a multi-touch interface. A straightforward and easy-controlled man-machine interface is provided to solve problems described above. According to the present invention, a user interface icon indicated by a first touch signal on the multi-touch interface is selected by means of being touched lightly, instead of being pointed in prior arts, on the multi-touch interface.

According to one embodiment of the present invention, a signal processing method of a man-machine interface, applied to a multi-touch panel, is provided. The method comprises steps of: receiving a first touch signal; recognizing an object corresponding to the first touch signal; determining whether a second touch signal is received while receiving the first touch signal; and selecting the object corresponding to the first touch signal when receiving the second touch signal.

According to another embodiment of the present invention, a signal processing apparatus of a man-machine interface is provided. The signal processing apparatus comprises: a multi-touch panel for receiving a first touch signal and a second touch signal; a recognizing module, for recognizing an object corresponding to a first touch signal received at the multi-touch panel; and a processing module, coupled to the recognizing module, for selecting the object when receiving a second touch signal while the recognizing module recognizing the object.

According to another embodiment of the present invention, a selection method of selecting a user interface icon among a plurality of user interface icons, applied to a multi-touch interface, is provided. The selection method comprises steps of: receiving a first touch signal; recognizing the user interface icon corresponding to the first touch signal among the icons; and selecting the user interface icon corresponding to the first touch signal when receiving a second touch signal while recognizing the user interface icon.

BRIEF DESCRIPTION OF THE DRAWINGS

The present invention will become more readily apparent to those ordinarily skilled in the art after reviewing the following detailed description and accompanying drawings, in which.

DETAILED DESCRIPTION OF THE PREFERRED EMBODIMENT

Figure 1:
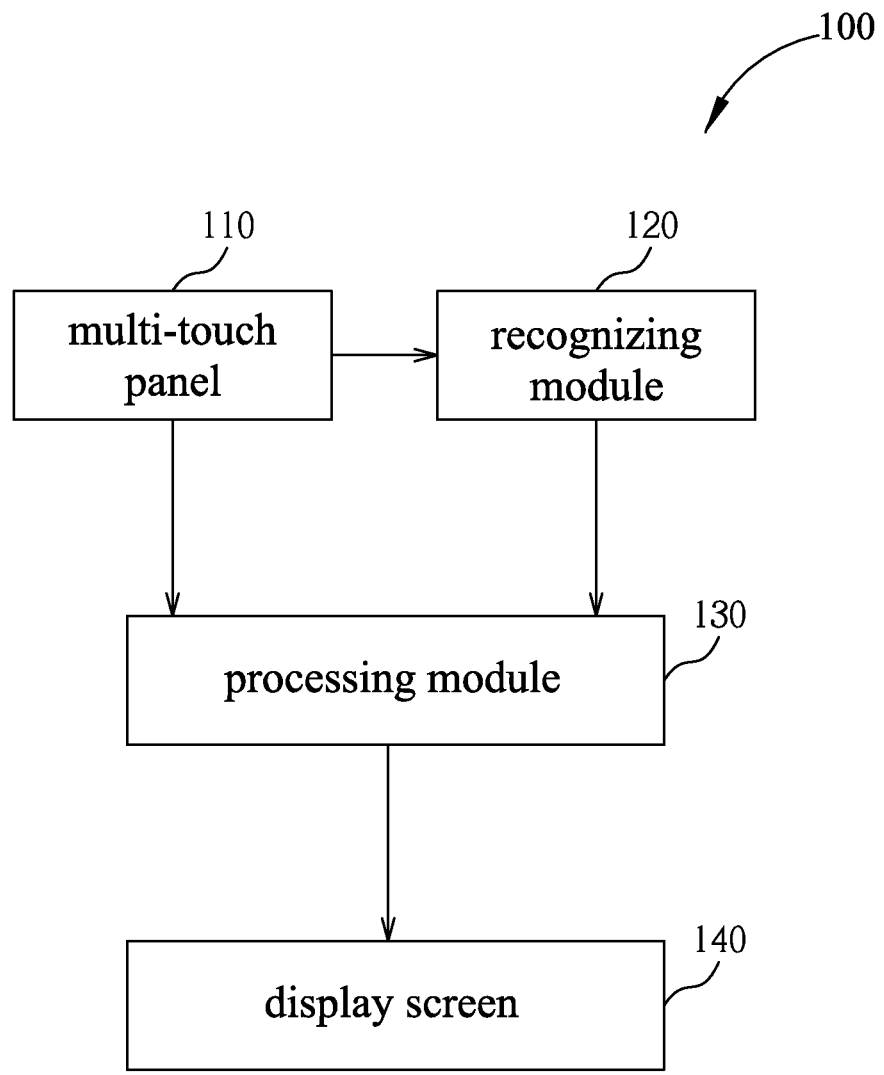
FIG. 1 is a block diagram of a multi-touch interface according to one embodiment of the present invention.

A multi-touch interface is one of the man-machine interfaces and capable of recognizing a plurality of touch points on a multi-touch panel or screen. Based on the characteristics of the multi-touch interface, the present invention provides an operating method of an electronic apparatus, which is different from a prior pointing method. FIG. 1 is a block diagram of a multi-touch interface 100 according to one embodiment of the present invention. The multi-touch interface 100 comprises a multi-touch panel 110, a recognizing module 120, a processing module 130, and a display screen 140. The multi-touch interface 100 may be applied to embedded systems, such as a mobile phone, a personal digital assistant (PDA), a navigation apparatus, or electronic apparatuses, such as a computer.

Figure 2:
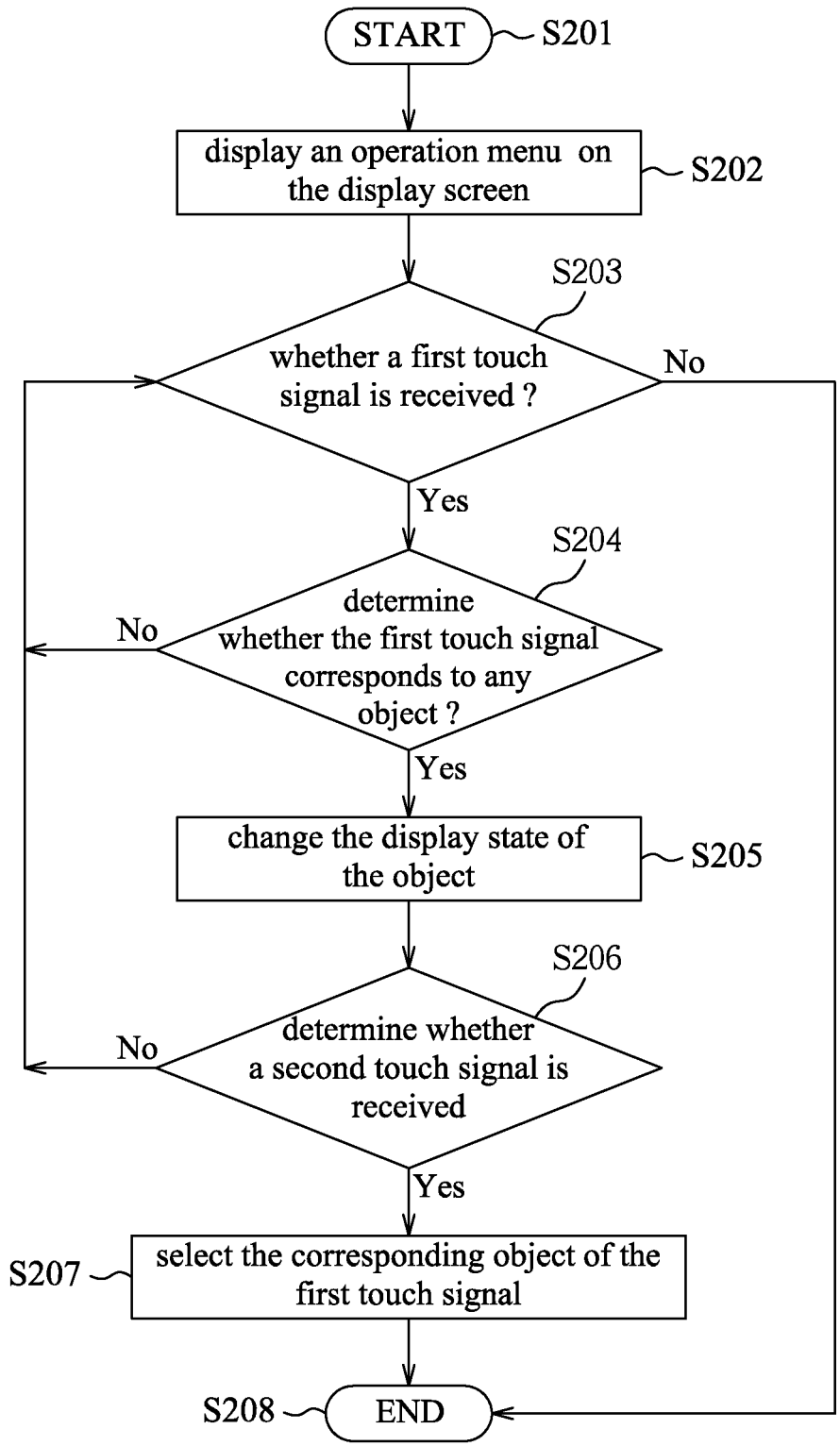
FIG. 2 is a flow chart of a signal processing method of a multi-touch interface according to one embodiment of the present invention.

FIG. 2 is a flow chart of a signal processing method of a multi-touch interface according to one embodiment of the present invention. After starting with Step S201, an operation menu is displayed on the display screen 140 in Step 202. The operation menu contains a plurality of objects for a user to select, such as a plurality of user interface icons representing different application programs. Next, in Step S203, whether a first touch signal is received from the multi-touch panel 110 is detected. When the first touch signal is received, Step S204 is performed. Otherwise, Step S208 is performed. When touched by a user, the multi-touch panel 110 generates the first touch signal according to the touch point, and outputs the first touch signal to the recognizing module 120. In one embodiment, the multi-touch panel 110 detects whether the touch point exists at regular time intervals. If the touch point persists, the multi-touch panel 110 continues generating the first touch signal until the touch point disappears. Next, in Step S204, the recognizing module 120 identifies the position or the coordinate touched by the user on the multi-touch panel 110 according to the first touch signal, and then determines whether the position corresponds to any object accordingly. When the result of S204 is affirmative, Step S205 is performed. Otherwise, Step S203 is performed again. In Step S205, after the object is recognized by the recognizing module 120, the processing module 130 controls the display screen 140 to change the display state of the object. In Step S206, it is determined whether a second touch signal is received. When the result of Step S206 is affirmative, Step S207 is performed. Otherwise, Step S203 is performed again. In Step S207, when the multi-touch panel 110 receives the second touch signal under the presence of the first touch signal, the processing module 130 selects the corresponding object recognized by the recognizing module 120. The flow ends at Step S208.

Figure 3:
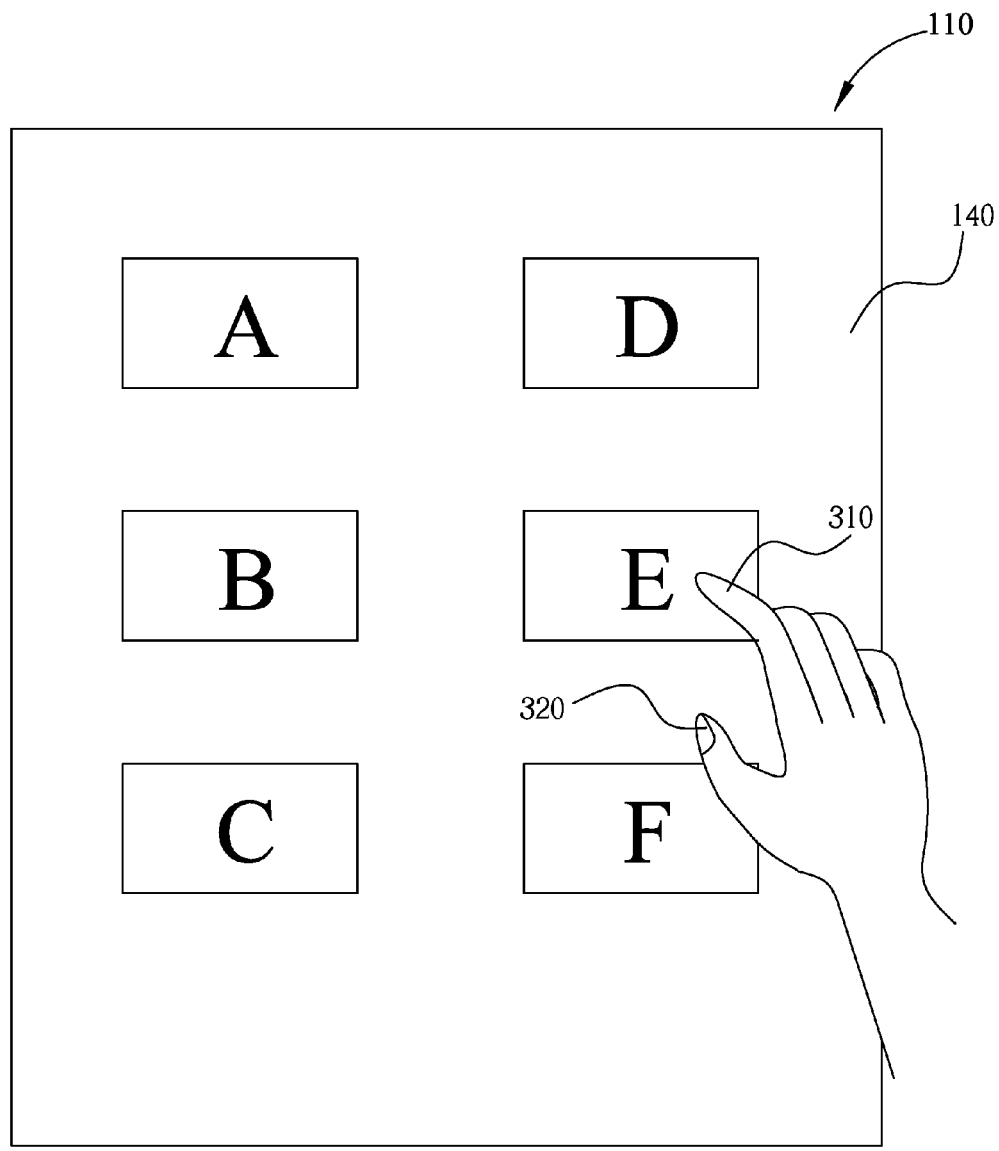
FIG. 3 is a schematic diagram of an operating method for selecting an application program on a display screen.

FIG. 3 is a schematic diagram of an operation menu displayed on a display screen. As shown in FIG. 3, the operation menu displayed on the display screen 140 comprises icons of application programs A to E. In this embodiment, the multi-touch panel 110 is provided on the display screen 140. However, the multi-touch panel 110 and the display screen 140 may be provided separately. When a user wants to execute the application program E displayed on the display screen 140, a finger 310 of the user first touches and then remains on a position corresponding to the application program E on the multi-touch panel 110. Then, another finger 320 randomly touches another position on the multi-touch panel 110 to select the application program E. The operation of the multi-touch interface 110 in the above actions is described in the following. The multi-touch panel 110 generates a first touch signal when touched by the finger 310. The first touch signal persists as long as the finger 310 keeps touching the multi-touch panel 110. The recognizing module 120 identifies the position touched by the finger 310 and recognizes the corresponding object according to the first touch signal. When the finger 320 touches the multi-touch panel 110, the multi-touch panel 110 acknowledges the touching of the finger 320 as the second touch signal due to the presence of the first touch signal. Then the processing module 130 selects the object, which is the application program E, as indicated by the first touch signal.

Figure 4:
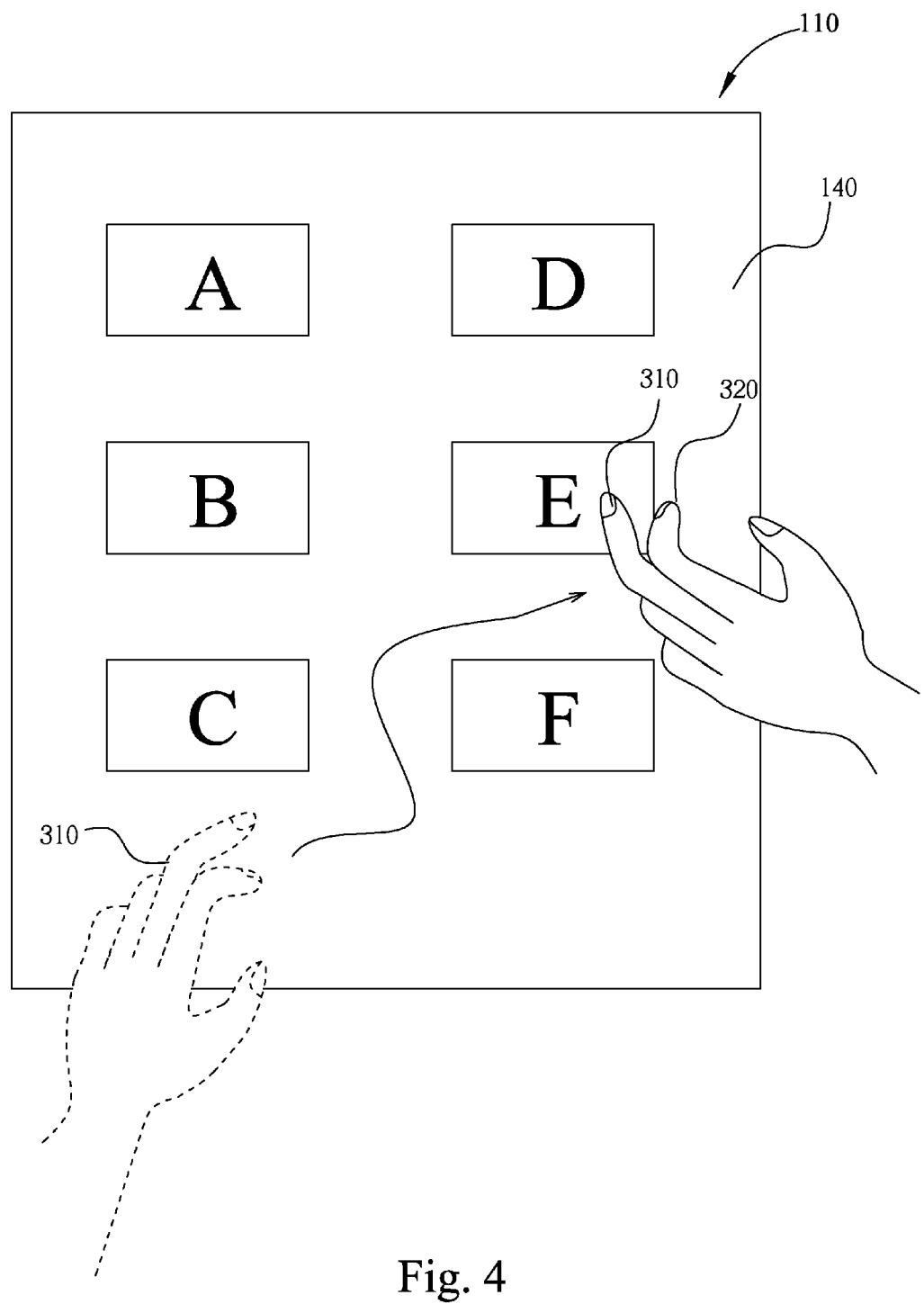
FIG. 4 is a schematic diagram of another operating method for selecting an application program on a display screen.

The first touch signal generated by the finger 310 provides a function similar to a mouse cursor, and the second touch signal generated by the finger 320 informs the processing module 130 to select the current object indicated by the first touch signal. The signal, generated from the time that the finger 310, touches the multi-touch panel 110 to the time that the finger 310 separates away from the multi-touch panel 110, is distinguished as the first touch signal by the multi-touch interface 100. Therefore, even the touch point touched by the finger 310 on the multi-touch panel 110 keeps moving, the first touch signal still keeps being generated until the touch point triggered by the finger 310 disappears when the finger 310 separates from the multi-touch panel 110. As shown in FIG. 4, the finger 310 may slide on the multi-touch panel 110. According to the movement of the touch point, the recognizing module 120 updates the recognized result, such as the position of the touch point and whether the position corresponds to an application program. When the finger 310 moves to the position of the desired application program, which is, for example, the position of the finger drawn in solid lines in FIG. 4, the multi-touch panel 110 is touched by the other finger 320 to generate the second touch signal. Upon receiving the second touch signal, the processing module 130 selects the application program E according to the current recognized result from the recognizing module 120.

During the above procedure, instead of pointing hard at the multi-touch panel 110, the user only needs to simply slide one finger to the desired position while having another finger lightly touch the multi-touch panel 110. Upon receiving the second touch signal under the presence of the first touch signal, the multi-touch interface 100 selects the object indicated by the first touch signal. Therefore, compared with the prior art, the present invention can save efforts and is also adaptive to customs of the user's fingers. Although the fingers are taken as an example in above embodiments, the multi-touch panel 110 may also be touched by a touch pen or other tools in other embodiments. It is to be noted that there is no limitation in the technology applied to the multi-touch panel 110 according to the present invention. For example, the multi-touch panel 110 may be a capacitive or resistive touch panel. Further, the technology of identifying a position of a touch point is not limited in the recognizing module 120.

Figure 5:
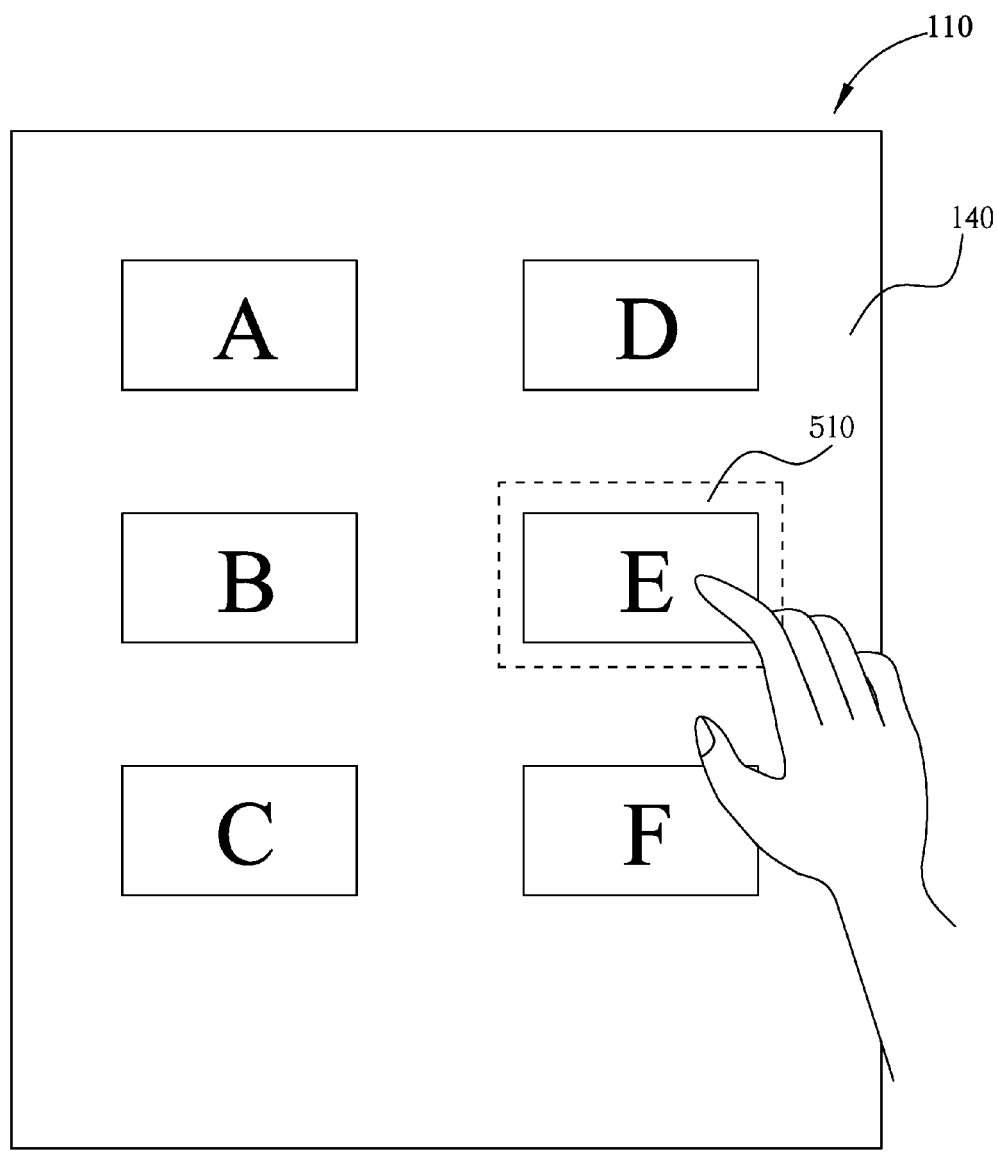
FIG. 5 is a schematic diagram of one embodiment of displaying an indicated application program with different display states on a display screen.
Figure 6:
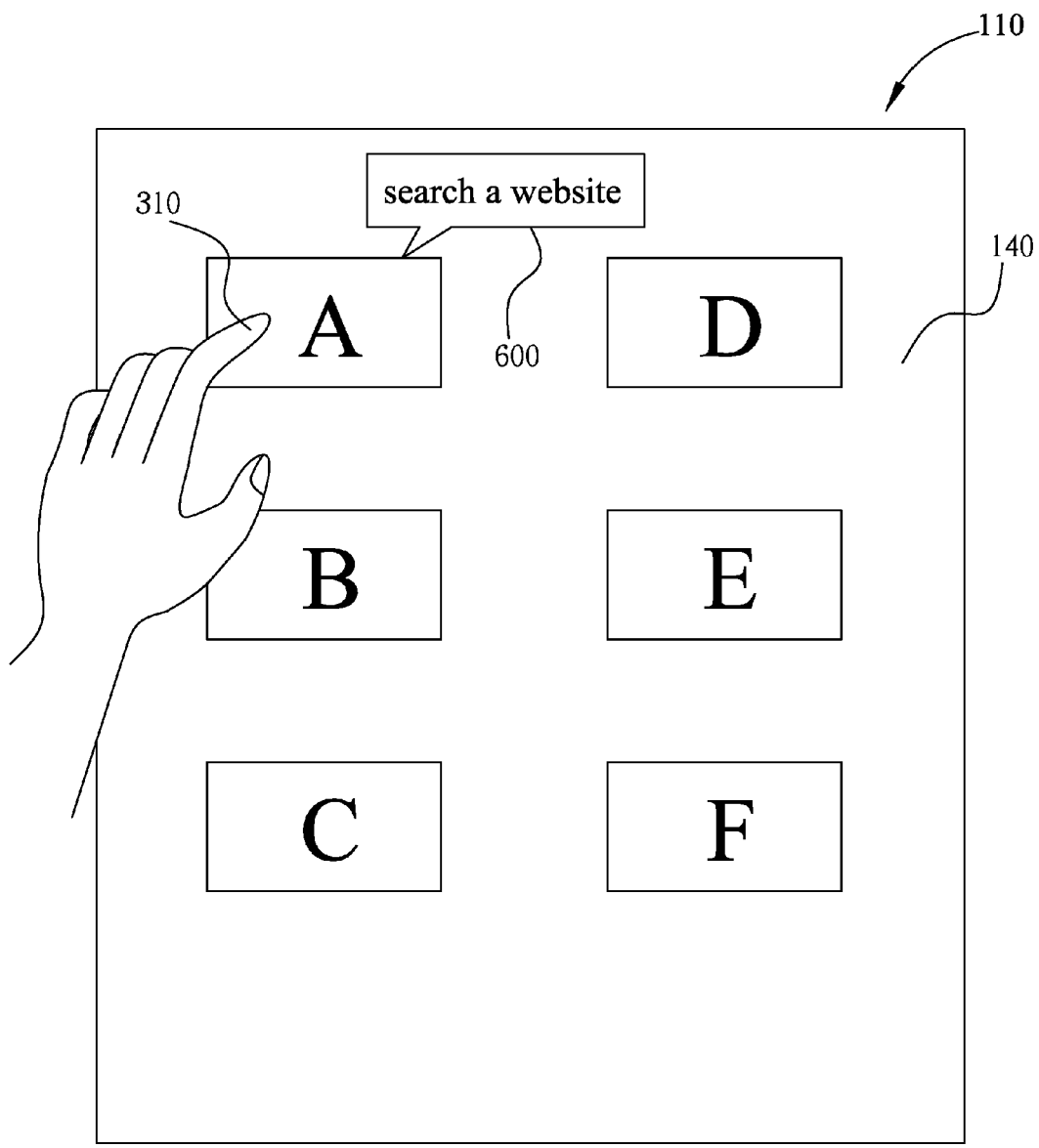
FIG. 6 is a schematic diagram of another embodiment of displaying an indicated application program with different display states on a display screen.
Figure 7:
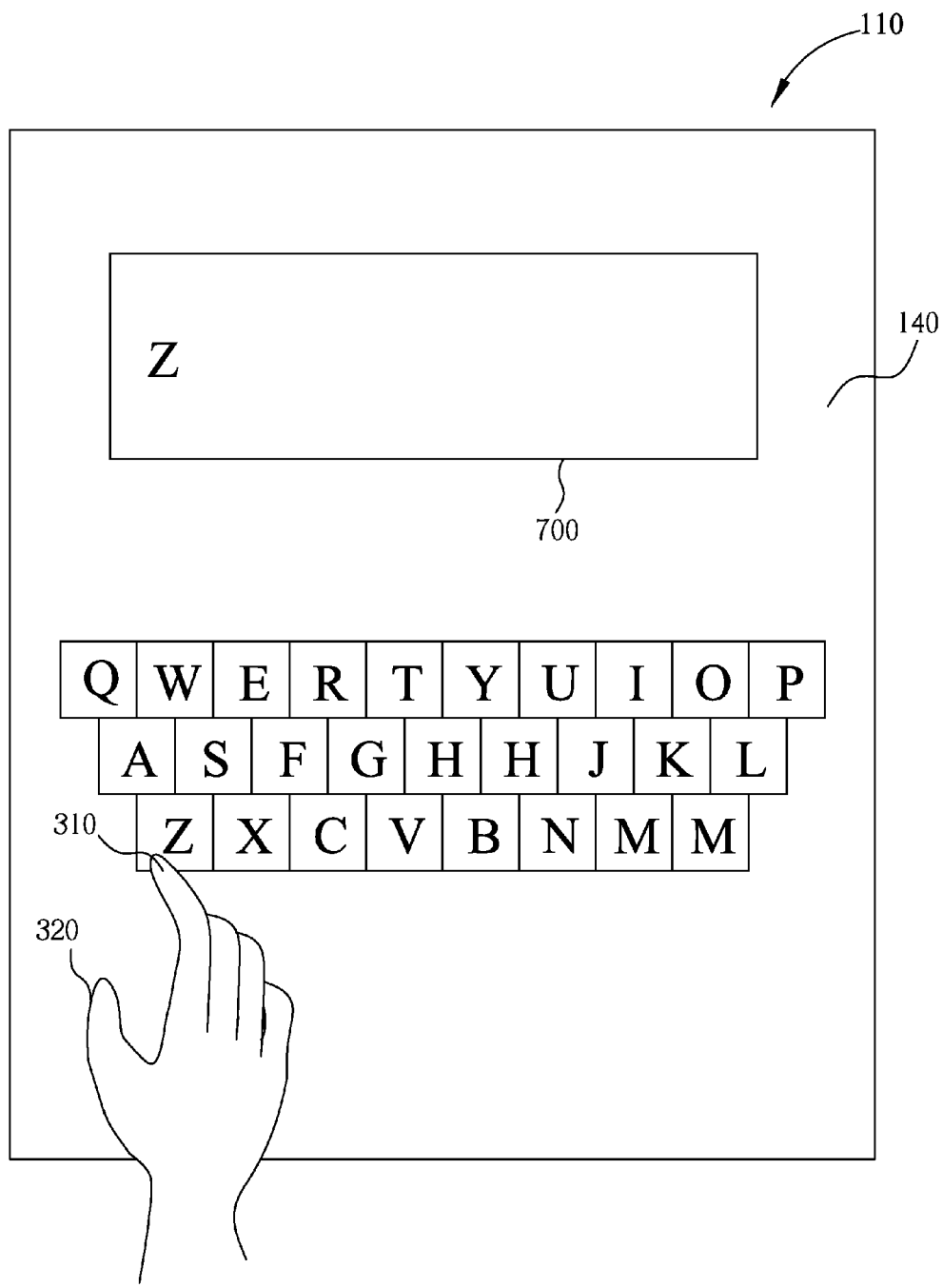
FIG. 7 is a schematic diagram of another embodiment of displaying an indicated application program with different display states on a display screen.

In addition, the position indicated by the first touch signal may be highlighted by an obvious light-spot, or an icon such as an index or a cursor, to facilitate the users to conveniently confirm the desired position. In one embodiment, the processing module 130 further controls the display screen 140 to specifically display the object indicated by the first touch signal—when not indicated by the first touch signal, the object is displayed with a first display state on the display screen 140; on the contrary, when indicated by the first touch signal, the object is displayed with a second display state, which is different from the first display state, on the display screen 140. As shown in FIG. 5 according to one embodiment, the icon of the application E indicated by the first touch signal is enlarged and is specifically highlighted by a light frame 510. As shown in FIG. 6, when the finger 310 slides on the icon of the application, content or reference information 600 of the application is displayed beside the application program. FIG. 7 shows another embodiment. When the multi-touch interface 100 is applied for entering letters, the letter skimmed by the finger 310 may be enlarged or specifically displayed in a window, like a window 700 showing "Z" in FIG. 7. The skimmed letter is then selected by the processing module 130 when the multi-touch panel 110 receives the second touch signal triggered by the finger 320.

In the foregoing embodiment of specifically displaying the indicated object with another display state, the recognizing module 120 needs to recognize the object when receiving the first touch signal. However, when the multi-touch interface 100 does not specifically display the indicated object on the display screen 140, the recognizing module 120 then subsequently identifies the corresponding position and object of the first touch signal after receiving the second touch signal to similarly achieve advantages of being effort-saving, convenient and easily controlled.

In another embodiment, the processing module 130 selects the object indicated by the first touch signal, when receiving a specific combination of second touch signals instead of a random second touch signal. For example, the second touch signals of the specific combination have specific moving directions or specific touching time, or are consecutively triggered during a predetermined period. Therefore, when the multi-touch panel 110 receives second touch signals under the presence of the first touch signal, the processing module 130 determines whether those second signals match a predetermined condition, and selects the object indicated by the first touch signal when those second signals match the predetermined condition. This embodiment effectively prevents accidently triggered instructions when the multi-touch interface 100 is applied to an electrical apparatuses with high security requirements. Further, the function of the object, which is indicated by the first touch signal, may be modified by various specific setting combinations.

The recognizing module 120 and the processing module 130 in FIG. 1 are comprised by the signal processing apparatus of the multi-touch panel 110 according to one embodiment. However, in practice, the recognizing module 120 and the processing module 130 both may be realized through executing specific software by a processor or a calculation apparatus.

While the invention has been described in terms of what is presently considered to be the most practical and preferred embodiments, it is to be understood that the invention needs not to be limited to the above embodiments. On the contrary, it is intended to cover various modifications and similar arrangements included within the spirit and scope of the appended claims which are to be accorded with the broadest interpretation so as to encompass all such modifications and similar structures.

What is claimed is:

1. A signal processing method of a man-machine interface, applied to a multi-touch panel, comprising steps of:
    receiving a first touch signal;
    recognizing an object corresponding to the first touch signal;
    determining whether a second touch signal is received while receiving the first touch signal;
    selecting the object corresponding to the first touch signal when receiving the second touch signal; and
    generating the second touch signal when a random position on the multi-touch panel is touched while receiving the first touch signal.

2. The signal processing method as claimed in claim 1, wherein the first touch signal is generated by a finger or a touch pen through touching the multi-touch panel.

3. The signal processing method as claimed in claim 2, wherein the step of recognizing the object corresponding to the first touch signal comprises:
    identifying a touched position on the multi-touch panel according to the first touch signal; and
    recognizing the object corresponding to the touched position.

4. The signal processing method as claimed in claim 2, wherein the first touch signal disappears when the finger or the touch pen separates away from a surface of the multi-touch panel.

5. The signal processing method as claimed in claim 1, the method further comprising a step of:
    displaying the object with a second display state when the object corresponds to the first touch signal; wherein the object is displayed with a first display state on a display screen before corresponding to the first touch signal, and the first display state is different from the second display state.

6. The signal processing method as claimed in claim 1, wherein the object is a user interface icon.

7. A signal processing apparatus of a man-machine interface, comprising:
    a multi-touch panel for receiving a first touch signal and a second touch signal;
    a recognizing module, for recognizing an object corresponding to a first touch signal received at the multi-touch panel; and
    a processing module, coupled to the recognizing module, for selecting the object when receiving a second touch signal while the recognizing module recognizing the object;
    wherein the second touch signal is generated when a random position on the multi-touch panel is touched while the recognizing module is recognizing the object.

8. The signal processing apparatus as claimed in claim 7, wherein the first touch signal is generated by a finger or a touch pen through touching the multi-touch panel.

9. The signal processing apparatus as claimed in claim 8, wherein the first touch signal disappears when the finger or the touch pen separates away from a surface of the multi-touch panel.

10. The signal processing apparatus as claimed in claim 7, wherein the multi-touch panel is provided on a surface of a display screen, and the recognizing module identifies a touched position of the multi-touch panel according to the first touch signal, and recognizes the object corresponding to the touched position.

11. The signal processing apparatus as claimed in claim 10, wherein the object is displayed on the display screen.

12. The signal processing apparatus as claimed in claim 11, wherein the object is displayed with a first display state on the display screen when the object does not correspond to the first touch signal, and the processing module controls the display screen to display the object with a second display state that is different from the first display state when the object corresponds to the first touch signal.

13. The signal processing apparatus as claimed in claim 12, wherein the object is a user interface icon.

14. A method of selecting a user interface icon among a plurality of icons, applied to a multi-touch panel, comprising steps of:
    receiving a first touch signal;
    recognizing the user interface icon corresponding to the first touch signal among the icons; and selecting the user interface icon corresponding to the first touch signal when receiving a second touch signal while recognizing the user interface icon; and
    generating the second touch signal when a random position on the multi-touch panel is touched while receiving the first touch signal.

15. The method as claimed in claim 14, wherein the step of recognizing the user interface icon corresponding to the first touch signal comprises:
    identifying a touched position on the multi-touched panel according to the first touch signal; and
    recognizing the user interface icon corresponding to the touched position.

16. The method as claimed in claim 15, further comprising a step of:
    generating the second touch signal when a random position on the multi-touch panel is touched while recognizing the user interface icon corresponding to the first touch signal.

17. The method as claimed in claim 14, the method further comprising a step of:

displaying the user interface icon with a second display state when the user interface icon corresponds to the first touch signal;

wherein the user interface icon is displayed with a first display state on a display screen before corresponding to the first touch signal, and the first display state is different from the second display state.

* * * * *